United States Patent [19]
Yamamoto

[11] Patent Number: 5,691,866
[45] Date of Patent: Nov. 25, 1997

[54] MAGNETIC HEAD AND METHOD OF MANUFACTURING THE SAME

[75] Inventor: Tatsushi Yamamoto, Nara-ken, Japan

[73] Assignee: Sharp Kabushiki Kaisha, Osaka, Japan

[21] Appl. No.: 604,380

[22] Filed: Feb. 21, 1996

Related U.S. Application Data

[63] Continuation of Ser. No. 359,844, Dec. 20, 1994, abandoned, which is a continuation of Ser. No. 88,259, Jul. 7, 1993, abandoned.

[30] Foreign Application Priority Data

Jul. 8, 1992 [JP] Japan .................. 4-180823

[51] Int. Cl.$^6$ .................................................. G11B 5/31
[52] U.S. Cl. ...................... 360/126; 360/119; 360/122
[58] Field of Search .............................. 360/119, 122, 360/125, 126

[56] References Cited

U.S. PATENT DOCUMENTS

| | | | |
|---|---|---|---|
| 4,764,832 | 8/1988 | Enz et al. | 360/120 |
| 4,799,118 | 1/1989 | Yamada et al. | 360/125 |
| 5,007,158 | 4/1991 | Ino et al. | 29/603 |
| 5,145,555 | 9/1992 | Yamamoto | 156/643 |
| 5,170,301 | 12/1992 | Muraoka et al. | 360/120 |
| 5,239,434 | 8/1993 | Naito et al. | 360/125 |
| 5,276,575 | 1/1994 | Kobayashi et al. | 360/126 |

FOREIGN PATENT DOCUMENTS

| | | | |
|---|---|---|---|
| A0224342 | 6/1987 | European Pat. Off. | |
| A0400966 | 12/1990 | European Pat. Off. | |
| A0448033 | 9/1991 | European Pat. Off. | |
| A0509461 | 10/1992 | European Pat. Off. | |
| A61-000905 | 1/1986 | Japan | |
| 61-39907 | 2/1986 | Japan | |
| 61-80512 | 4/1986 | Japan | |
| 62-170007 | 7/1987 | Japan | |
| 63-74103 | 4/1988 | Japan | 360/125 |
| A01033709 | 2/1989 | Japan | |
| A02105309 | 4/1990 | Japan | |
| A02220207 | 9/1990 | Japan | |
| 3-144904 | 6/1991 | Japan | |
| 3238605 | 10/1991 | Japan | 360/122 |
| A04229407 | 8/1992 | Japan | |

OTHER PUBLICATIONS

Database WPI, Section Ch. Week 9319, Derwent Publications Ltd., London, GB, Class L03, AN 93-155104 & JP-A-5 089 414 (Sharp K.K.) 9 Sparil 1993 *abstract*.

*Primary Examiner*—Stuart S. Levy
*Assistant Examiner*—William J. Klimowicz
*Attorney, Agent, or Firm*—David G. Conlin; Brian L. Michaelis

[57] ABSTRACT

A magnetic head has a magnetic core structured so that soft magnetic thin films and insulating thin films are stacked alternately. In each layer of the soft magnetic thin films, the thickness of the vicinity of a gap portion is made smaller than that of the other portions. According to this structure, it is possible to decrease a magnetic reluctance of the magnetic core. Such magnetic core is formed by repeating, to a substrate having a plurality of grooves formed thereon, the step of forming a thin film by using self-shadowing effects of a peak portion of the groove and the step of applying an anisotropic etching process.

6 Claims, 12 Drawing Sheets

MAGNETIC HEAD AND METHOD OF MANUFACTURING THE SAME

This application is a continuation of application Ser. No. 08/359,844 filed on Dec. 20, 1994, now abandoned, which is an FWC of Ser. No. 08/088,259 filed on Jul. 7, 1993, now abandoned.

BACKGROUND OF THE INVENTION

1. Field of the Invention

The present invention relates to magnetic heads, and more particularly, to a rotary magnetic head for a VCR, an R-DAT, a digital VCR and the like and a method manufacturing the same.

2. Description of the Background Art

With a magnetic recording technology having achieved and being required a high recording density and a wide bandwidth, a magnetic medium with a high coercive force such as a metal-particulate tape has been used as a recording medium in recent years. Therefore, a thin film of a soft magnetic alloy having a high saturation magnetic flux density is used as a material of a core of a magnetic head. For example, a magnetic head 1 of a structure in which a magnetic core 3 of a soft magnetic alloy thin film is interposed between non-magnetic materials 5, as shown in FIG. 11, has been proposed.

A magnetic head of a structure in which the thickness of a magnetic core at a magnetic gap portion is smaller than that at the other portions in order to enhance efficiency of the magnetic core is disclosed in, for example, Japanese Patent Laying-Open No. 3-269809. FIG. 12 is a perspective view of one example of the magnetic head disclosed therein. A magnetic core 9 included in a magnetic head 7 has a structure in which soft magnetic thin films and insulating films are stacked alternately. Magnetic core 9 is structured so as to be interposed between a non-magnetic substrate 13 and a low melting point glass 15. Although the thickness of a magnetic gap portion 11 serving as a track width in magnetic core 9 cannot be increased because it is determined by a standard, the thickness of the other portions can be increased. Therefore, efficiency of the magnetic core is improved by making the other portions large in thickness to increase a cross section area of magnetic core 9 and to decrease a magnetic reluctance of magnetic core 9. It should be noted that FIG. 13 is a perspective view of another example of the magnetic head disclosed in the above-described Japanese Patent Laying-Open No. 3-269809, in which an azimuth angle θ of magnetic head 7 is changed.

FIG. 14 is a partial plan view of a magnetic gap portion of the magnetic head shown in FIG. 12. Magnetic core 9 has a structure in which a soft magnetic thin film 17a, an insulating thin film 19a, a soft magnetic thin film 17b, an insulating thin film 19b, a soft magnetic thin film 17c, an insulating thin film 19c, and a soft magnetic thin film 17d are stacked alternately. By further stacking soft magnetic thin films 17c, 17d in a portion excluding magnetic gap portion 11 of magnetic core 9, a cross section of magnetic core 9 is increased. This structure can be obtained by etching soft magnetic thin film 17d, insulating thin film 19c, soft magnetic thin film 17c, and insulating thin film 19b positioned in magnetic gap portion 11 with ion milling after stacking soft magnetic thin films and insulating thin films alternately.

The larger the thickness of the soft magnetic thin film, the more difficult it is for the soft magnetic thin film to operate as a magnetic substance at a high frequency because of an eddy-current loss. Therefore, as shown in FIG. 14, by stacking soft magnetic thin films and insulating thin films alternately, the thickness of the soft magnetic thin film is reduced.

As described above, by making a portion excluding the magnetic gap portion of the magnetic core large in thickness, the cross section area of the magnetic core was increased, and the magnetic reluctance of the magnetic core was decreased. However, as shown in FIG. 14, soft magnetic thin films 17c, 17d positioned only in a portion excluding the vicinity of magnetic gap portion 11 are magnetically separated from soft magnetic thin films 17a, 17b constituting magnetic gap portion 11 through insulating thin films 19b, 19c. Therefore, even if the cross section area of the magnetic core was increased by stacking soft magnetic thin films 17c, 17d, the magnetic reluctance was not decreased sufficiently.

SUMMARY OF THE INVENTION

One object of the present invention is to provide a magnetic head having a magnetic core in which a magnetic reluctance can be further decreased.

Another object of the present invention is to provide a method of manufacturing a magnetic head having a magnetic core in which a magnetic reluctance can be further decreased.

One aspect of the present invention relates to a magnetic head having a magnetic core in which the thickness of the vicinity of a magnetic gap portion is smaller as compared to the thickness of the other portions. The magnetic head is characterized in that the magnetic core has a structure in which soft magnetic thin films and insulating thin films are stacked alternately, and that at least one layer of the soft magnetic thin films has the thickness smaller in the vicinity of the gap portion than in the other portions.

According to the above-described structure, the thickness of the soft magnetic thin films is made larger in the other portions than in the vicinity of the magnetic gap portion, so that the cross section area of the magnetic core is increased, and the magnetic reluctance thereof is decreased. Therefore, compared to a conventional example in which soft magnetic thin films constituting the magnetic gap portion and soft magnetic thin films for increasing the cross section area of the magnetic core are magnetically separated, the magnetic reluctance can be decreased since the insulating thin films are not interposed. Since the thickness of the soft magnetic thin films constituting the magnetic gap portion can be further decreased, it is possible to reduce the eddy-current loss.

Another aspect of the present invention relates to a method of manufacturing a magnetic head in which a first substrate and a second substrate each including a magnetic core including a soft magnetic thin film are got butted together, and bonded so that a magnetic gap is formed between the magnetic cores. The method includes the steps of: forming a plurality of V-shaped grooves on the surface of a substrate; forming a soft magnetic thin film on one wall face of each of the plurality of grooves by introducing particles which contribute to formation of a soft magnetic thin film serving as a magnetic core at a predetermined tilt angle with respect to the ungrooved substrate normal and by using self-shadowing effects of peak portions of the grooves; applying an anisotropic etching process only to the vicinity of the peaks of the soft magnetic thin films to reduce the same in thickness by introducing particles which contribute to etching into the substrate having the soft magnetic thin film formed thereon so that they are directed only to the vicinity of the peaks of the plurality of grooves; forming an insulating thin film on the surface of the soft magnetic thin film by using self-shadowing effects of the peak portion on the wall face of each of the plurality of grooves; forming on the surface of the insulating thin film a stacked structure of soft magnetic thin films and insulating thin films by repeating a predetermined number of times the step of forming the soft magnetic thin film and the step of forming the insulating thin film; filling each groove with low melting point glass; cutting the substrate along a direction orthogonal to a direction in which the groove extends to divide the substrate into a first substrate and a second substrate; and bonding the first substrate and the second substrate by melting low melting point glass after the first substrate and the second substrate are got butted together so that a magnetic gap is formed between a magnetic core of the first substrate and a magnetic core of the second substrate.

In the above-described method, the thickness of the upper portion of the soft magnetic thin film formed on one wall face is reduced to make a magnetic core by means of an anisotropic dry etching by using self-shadowing effects of the peak portion of the wall face of the groove. The upper portion of the soft magnetic thin film formed on one wall face serves as a magnetic gap portion. Therefore, it is possible to manufacture a magnetic head having the thickness of the soft magnetic thin film smaller in the magnetic gap portion than in the other portions.

In a preferred embodiment of the method of manufacturing a magnetic head according to the present invention, the step of forming the soft magnetic thin film and the step of reducing the thickness of the portion of the soft magnetic thin film formed on one wall face by means of an anisotropic etching are carried out simultaneously. By this method, a time required for formation of the soft magnetic thin film can be shortened. As for the step of applying an anisotropic etching process to reduce the portion of the soft magnetic thin film formed on one wall face, ion milling or reactive ion etching is used.

In another preferred embodiment of the method of manufacturing a magnetic head according to the present invention, the step of forming the soft magnetic thin film on one wall face of each groove includes the step of introducing particles which contribute to formation of the soft magnetic thin film at a predetermined tilt angle with respect to the ungrooved substrate normal. The step of reducing the thickness of only the portion of the upper portion of the soft magnetic thin film formed on one wall face includes the step of introducing particles which contribute to ion milling at a tilt angle larger than the predetermined tilt angle with respect to the ungrooved substrate normal. According to this method, it is possible to process the soft magnetic thin film serving as a magnetic core into a desired shape efficiently by using self-shadowing effects of the peak portion on the wall face of each groove.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description will be given on the magnetic head according to the first embodiment of the present invention and the method of manufacturing the same hereinafter with reference to FIGS. 1 to 9.

Figure 1:
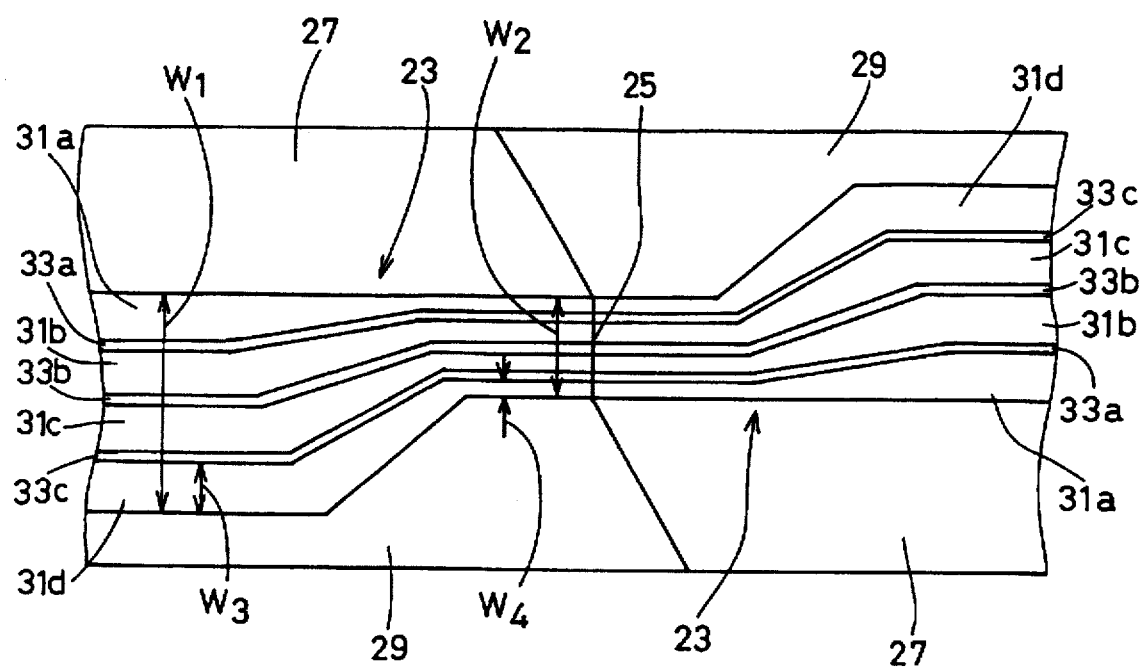
FIG. 1 is a partial plan view of a first embodiment of a magnetic head according to the present invention.

FIG. 1 is a partial plan view of the first embodiment of the present invention. A magnetic core 23 has a structure in which a soft magnetic thin film 31a, an insulating thin film 33a, a soft magnetic thin film 31b, an insulating thin film 33b, a soft magnetic thin film 31c, an insulating thin film 33c, and a soft magnetic thin film 31d are stacked alternately. A material of the soft magnetic thin film includes an FeAlSi system alloy, an NiFe system alloy, an FeSi system alloy, an FeSiCo system alloy, an FeSiGa system alloy and a CoNbZr system alloy. A material of the insulating thin film includes non-magnetic oxide, for example, $SiO_2$, $Al_2O_3$, and a soft magnetic insulating material such as a ferrite thin film.

A thickness W2 of a magnetic gap portion 25 of magnetic core 23 is made smaller compared to a thickness W1 of the other portions. More specifically, by making the thickness W1 of the other portions larger than the thickness W2 of magnetic gap portion 25, the cross section area of magnetic core 23 is increased, and the magnetic reluctance thereof is decreased. A thickness W4 in magnetic gap portion 25 of soft magnetic thin films 31a, 31b, 31c, 31d is made smaller compared to a thickness W3 in the other portions of the soft magnetic thin films 31a, 31b, 31c, 31d. More specifically, in the first embodiment of the present invention, by making the thickness W3 of the other portions larger than the thickness W4 of magnetic gap portion 25 of the soft magnetic thin films 31a, 31b, 31c, 31d, the cross section area of magnetic core 23 is increased. Since there is no insulating thin film between the soft magnetic thin film in magnetic gap portion 25 and the soft magnetic thin film in the other portions, it is possible to further decrease the magnetic reluctance compared to a conventional example having the insulating thin film therebetween. Although the thickness W4 is made smaller than the thickness W3 in all of the soft magnetic thin films 31a, 31b, 31c, 31d in the first embodiment, the present invention is not limited thereto, but the thickness W4 may be smaller than the thickness W3 in one or more of the soft magnetic thin films 31a, 31b, 31c, 31d.

The number of the soft magnetic thin film is determined by a standard on which the magnetic head operates, although four soft magneitc thin films are shown in FIG. 1 for drawing convenience.

Magnetic core 23, formed on a non-magnetic substrate 27, is interposed between non-magnetic substrate 27 and a low melting point glass 29. A material of the non-magnetic substrate includes, for example, ceramics and crystallized glass. The material of non-magnetic substrate 27 is selected taking into consideration matching of thermal expansion with respect to a material of the soft magnetic thin film and abrasion characteristics. The thickness W2 corresponds to the track width of the magnetic head.

Figure 2:
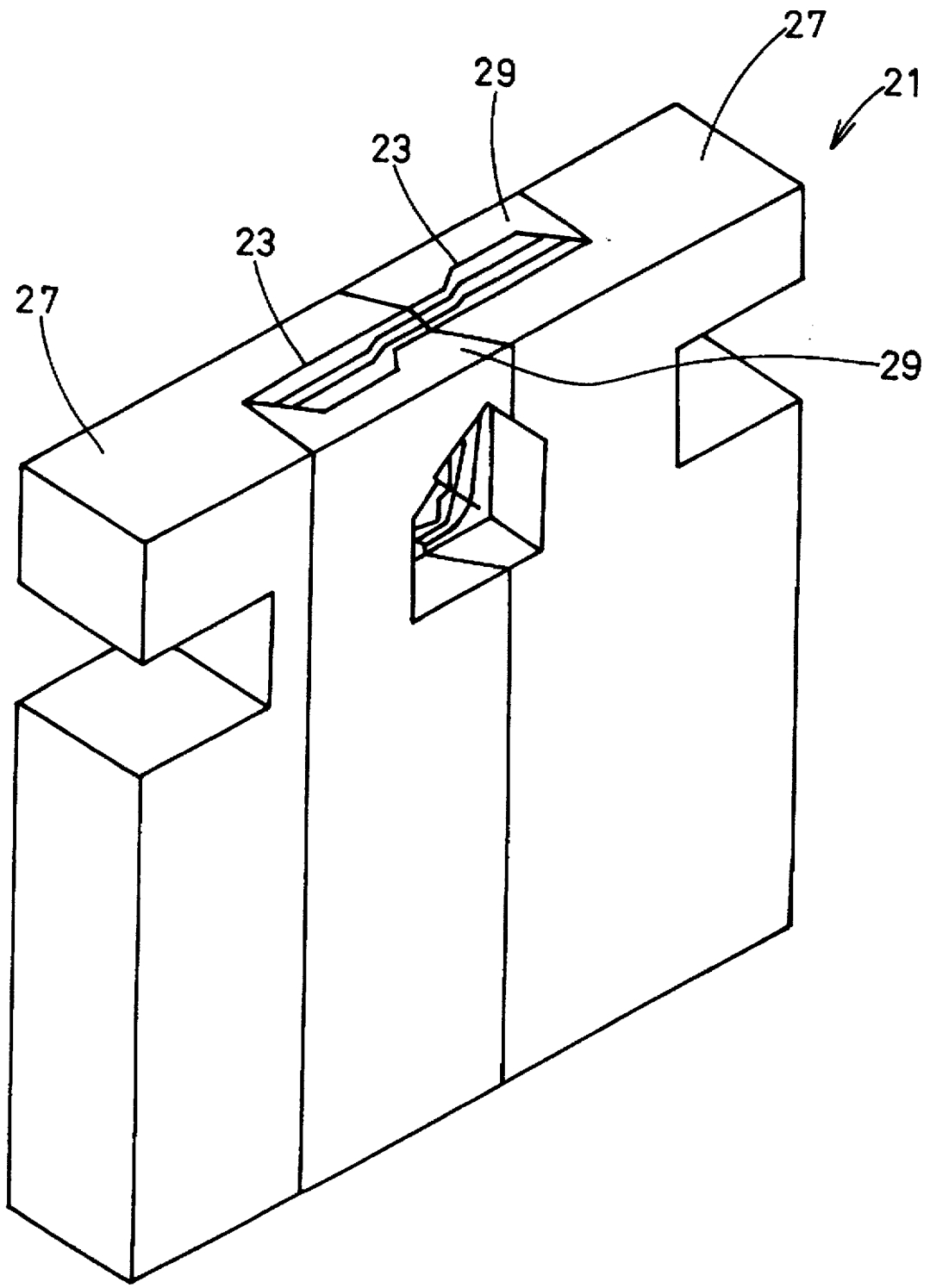
FIG. 2 is a perspective view of the first embodiment of the magnetic head according to the present invention.

FIG. 2 is a perspective view of the first embodiment of the magnetic head according to the present invention. A magnetic head 21 has a structure in which magnetic core 23 is interposed between non-magnetic substrate 27 and low melting point glass 29. A coil wire wounded around magnetic head 21 and a gap spacer are not shown for avoiding complexity.

Figure 3:
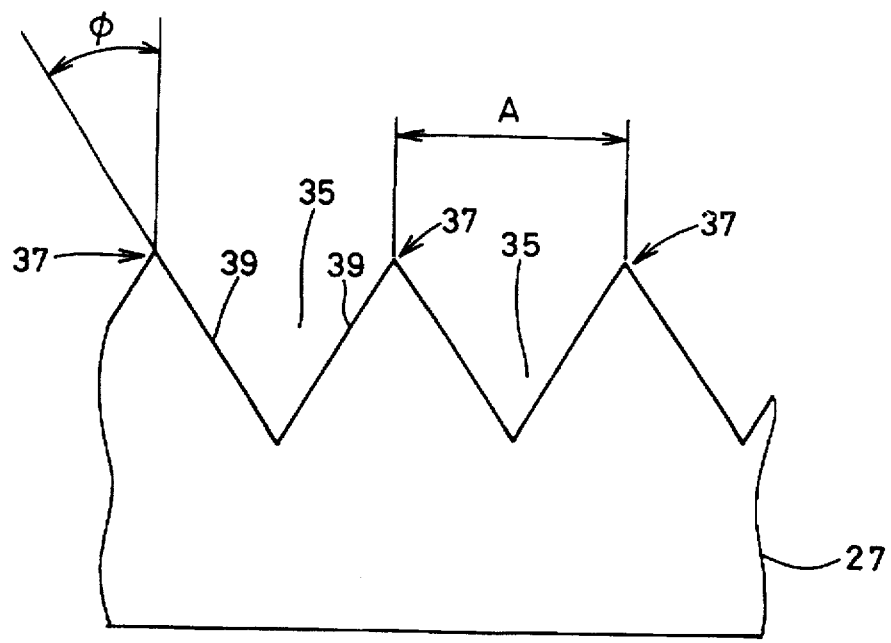
FIGS. 3 to 9 are partial cross sectional views showing in order the steps of a method of manufacturing the magnetic head of the first embodiment according to the present invention.

Description will now be given on a method of manufacturing the magnetic head of the first embodiment according to the present invention. As shown in FIG. 3, a plurality of V-shaped grooves 35 are formed on the surface of non-magnetic substrate 27 by using a rotating abrasive blade. Each of V-shaped grooves 35 has a wall face 39 and a peak portion 37. A pitch dimension A is determined by taking into consideration the final thickness of the magnetic head and a cutting margin. An angle φ between wall face 39 and a normal of the initial surface of non-magnetic substrate 27 and the pitch dimension A are determined by the width and azimuth of the magnetic core finally required for the finished magnetic head.

Figure 4:
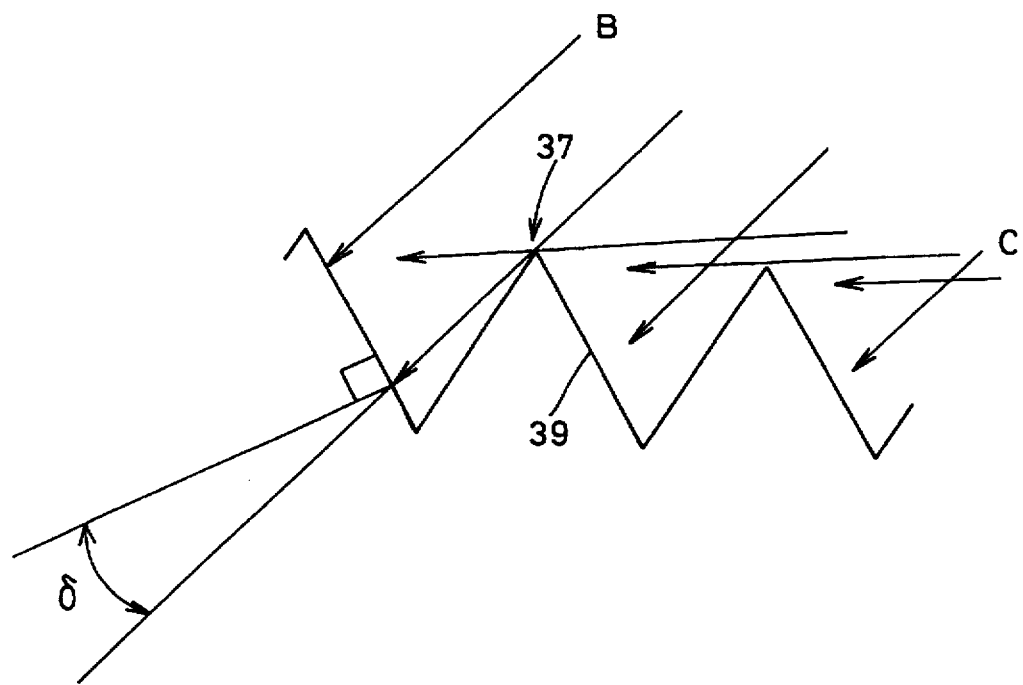

As shown in FIG. 4, a soft magnetic thin film is formed on one wall face 39 by introducing particles which contribute to formation of the soft magnetic thin film from a B direction and by using self-shadowing effects of peak portion 37. Simultaneously, the thickness of the upper portion of the soft magnetic thin film of one wall face 39 was decreased by introducing particles which contribute to ion milling from a C direction and by using self-shadowing effects of peak portion 37. Although it is preferred that these steps are carried out simultaneously, ion milling may be carried out after formation of the soft magnetic thin film. Since the thickness of portions excluding the magnetic gap portion of the soft magnetic thin film is set by taking into consideration a frequency range in which the magnetic head operates, it is possible to further reduce the eddy-current loss in the soft magnetic thin films constituting the magnetic gap portion.

An insulating thin film is formed on the soft magnetic thin film formed on one wall face 39 by introducing particles which contribute to formation of the insulating thin film from a B direction and by using self-shadowing effects of peak portion 37. The thickness of the insulating thin film on the upper portion of one wall face 39 may be decreased by ion milling. In order to obtain much higher recording density in the future, it will be required that the track width should be made smaller. As a result, to ensure the effective track width, the insulating thin film must be further made smaller in a range where insulation is kept.

Figure 5:
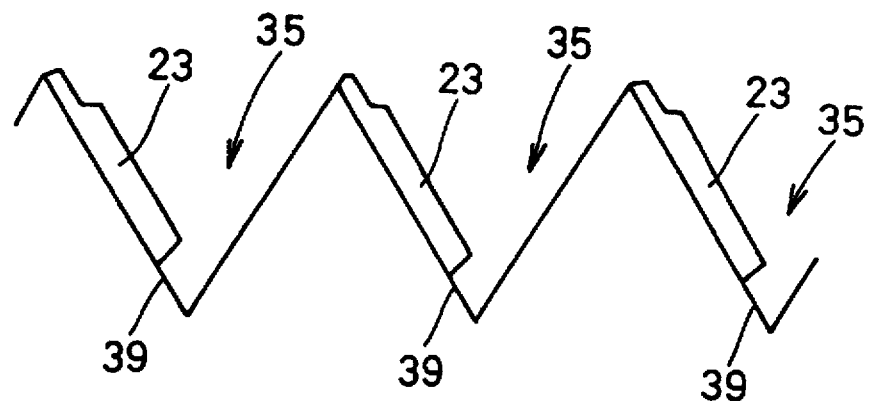

By again repeating the step of forming the soft magnetic thin film and the step of forming the insulating thin film alternately, magnetic core 23 is formed, as shown in FIG. 5. Although the soft magnetic thin film is etched by ion milling in this embodiment, the other anisotropic dry etching, for example, reactive ion etching, may be used. Although a method of forming a thin film includes a vacuum evaporation method, an ion plating method and a sputtering method, in order to obtain self-shadowing effects, it is preferred that a film is formed in a relatively high vacuum, allowing the mean free path of the particles is sufficiently longer than the pitch dimension of the V-shaped grooves.

Figure 6:
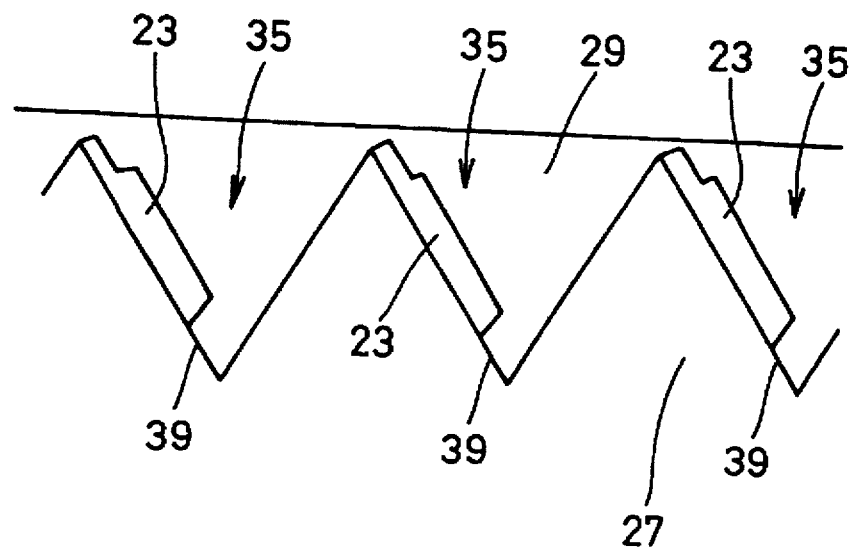

As shown in FIG. 6, a silicon oxide film (not shown) serving as a protection film is formed on the surface of magnetic core 23 of wall face 39. A metal (for example, Cr) (not shown) for improving wettability with glass is formed on the silicon oxide film. After that, low melting point glass 29 is filled in V-shaped groove 35, and planarized by removal of an excess of low melting point glass 29.

Figure 7:
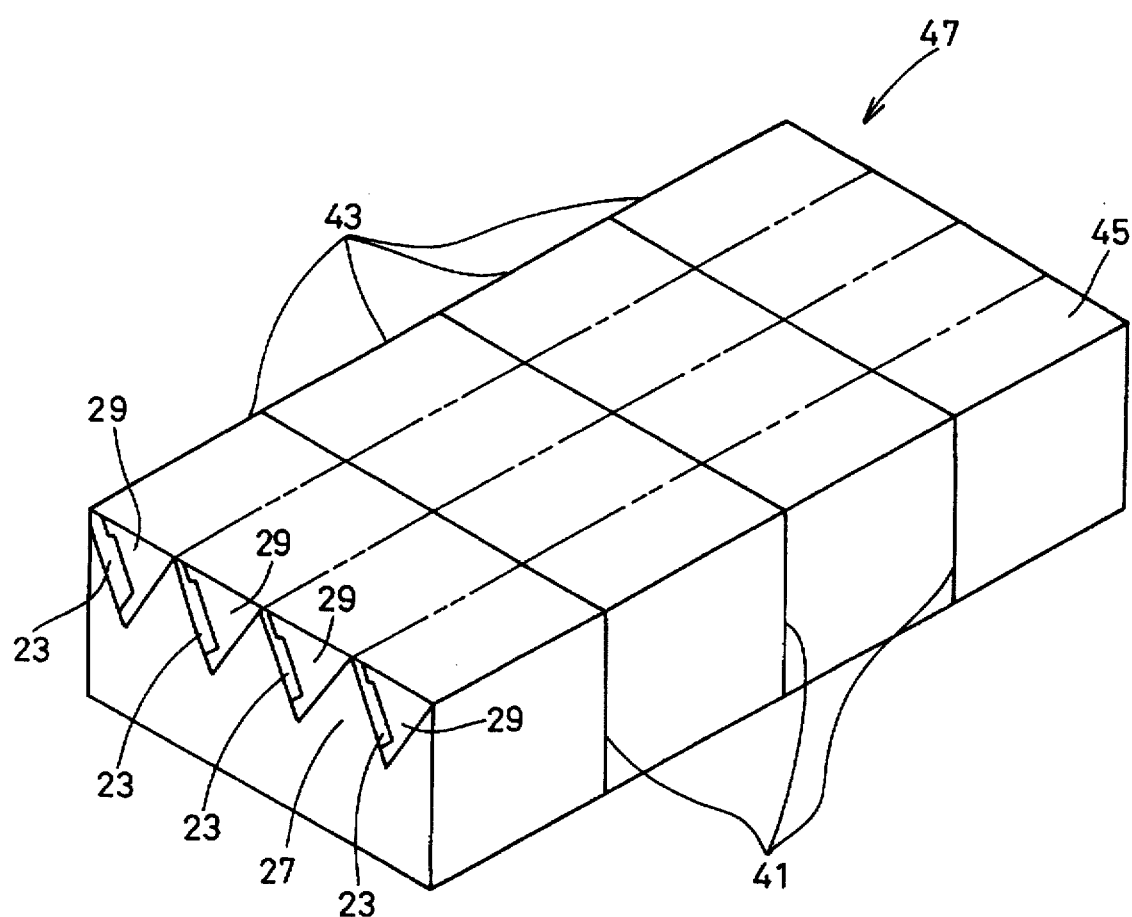

FIG. 7 is a perspective view of the state shown in FIG. 6. Referring to FIG. 7, a core block 47 is cut along a face 41 which is orthogonal to a direction in which V-shaped groove 35 extends to form a core piece 43. A space between faces 41 is a predetermined pitch. Although FIG. 7 shows the state where core block 47 is divided into four, it may be divided into more than four.

By applying the similar steps as those of process of a known VCR ferrite head to core piece 43 obtained as described above, formation of a groove serving as a coil winding window, precise polish of a gap opposing face 45, and formation of a gap spacer are carried out.

Figure 8:
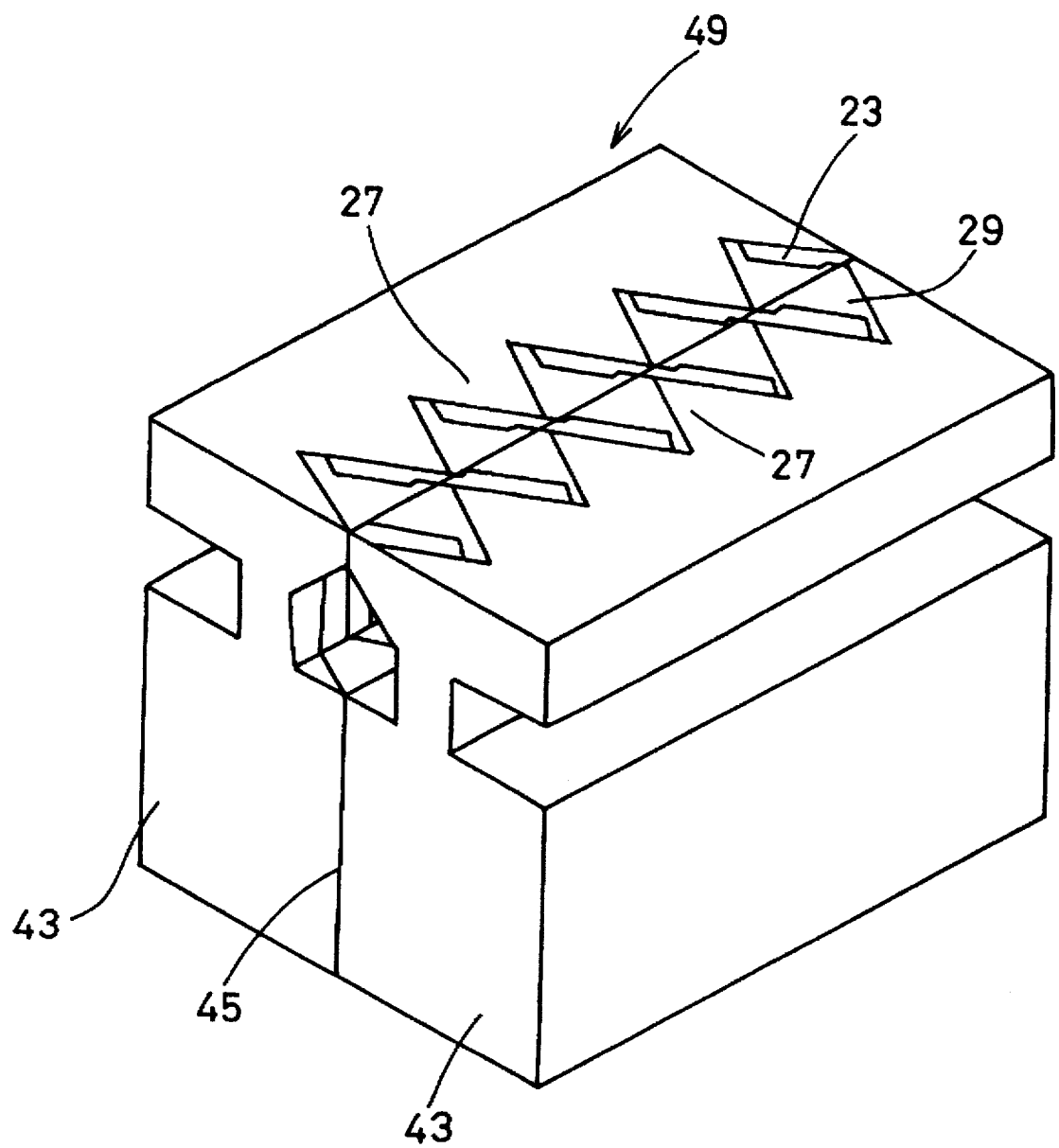

As shown in FIG. 8, gap opposing face 45 of one core piece 43 and gap opposing face 45 of the other core piece 43 are got butted together so that a magnetic gap portion is formed between magnetic core 23 of one core piece 43 and magnetic core 23 of the other core piece 43. Then, by melting low melting point glass 29, two core pieces 43, which are got butted together, are bonded with each other to form a magnetic head core block 49. Since magnetic head core block 49 is in the state where a multiple of magnetic head chips are integrated, it is divided into individual magnetic head chips in the next step.

Figure 9:
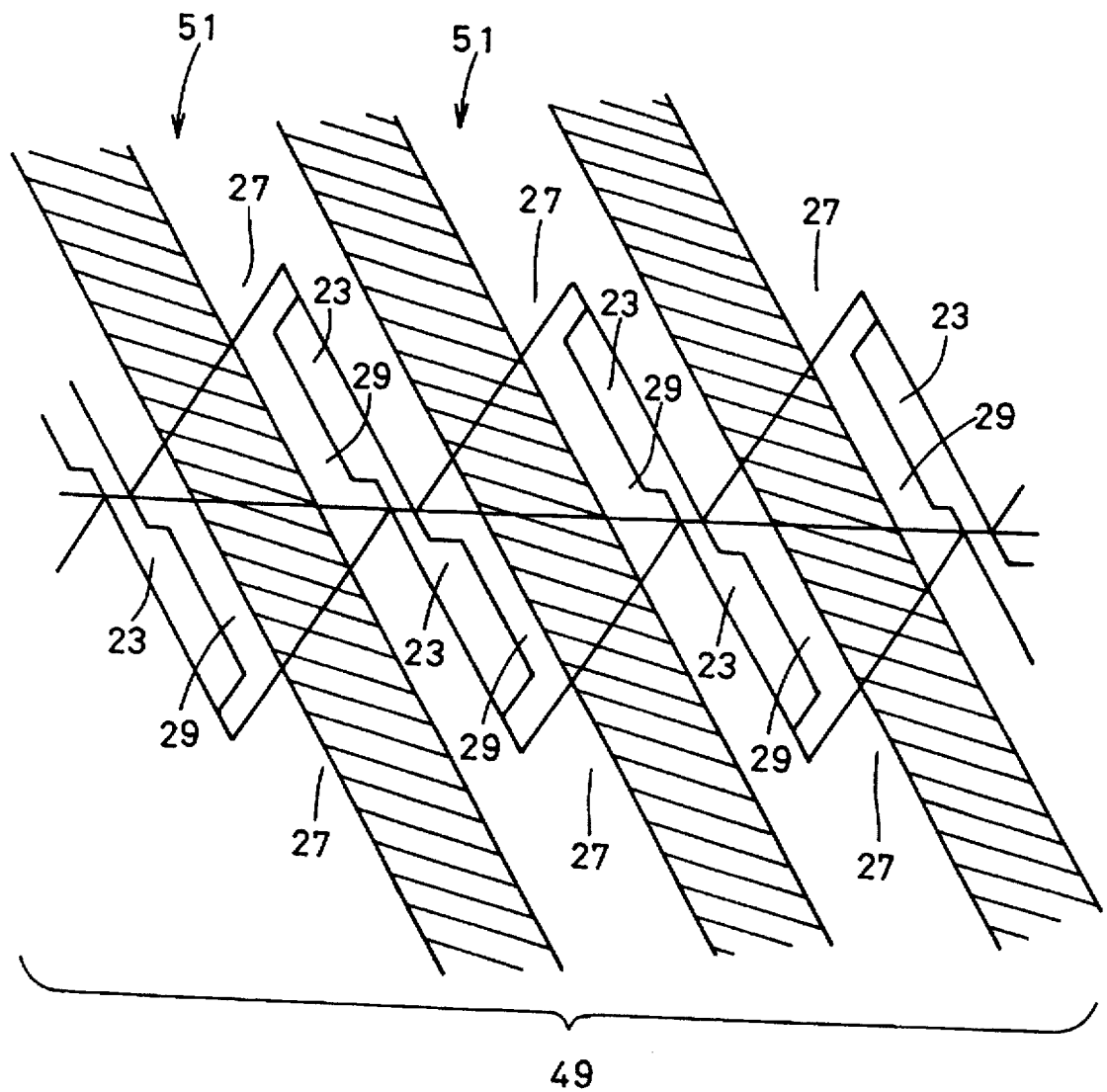

More specifically, magnetic head core block 49 is sliced with a hatched portion in FIG. 9 used as a cutting margin. In a shape and pitch A (cf. FIG. 3) of V-shaped groove 35, there is a case where the cutting face is not in parallel with magnetic core 23 as shown in the figure. By applying to magnetic head chip 51 thus obtained the finishing process of glueing to a base plate, coil winding, tape lapping and the like, as similar to the case of the conventional magnetic head, a magnetic head is finished.

Figure 10:
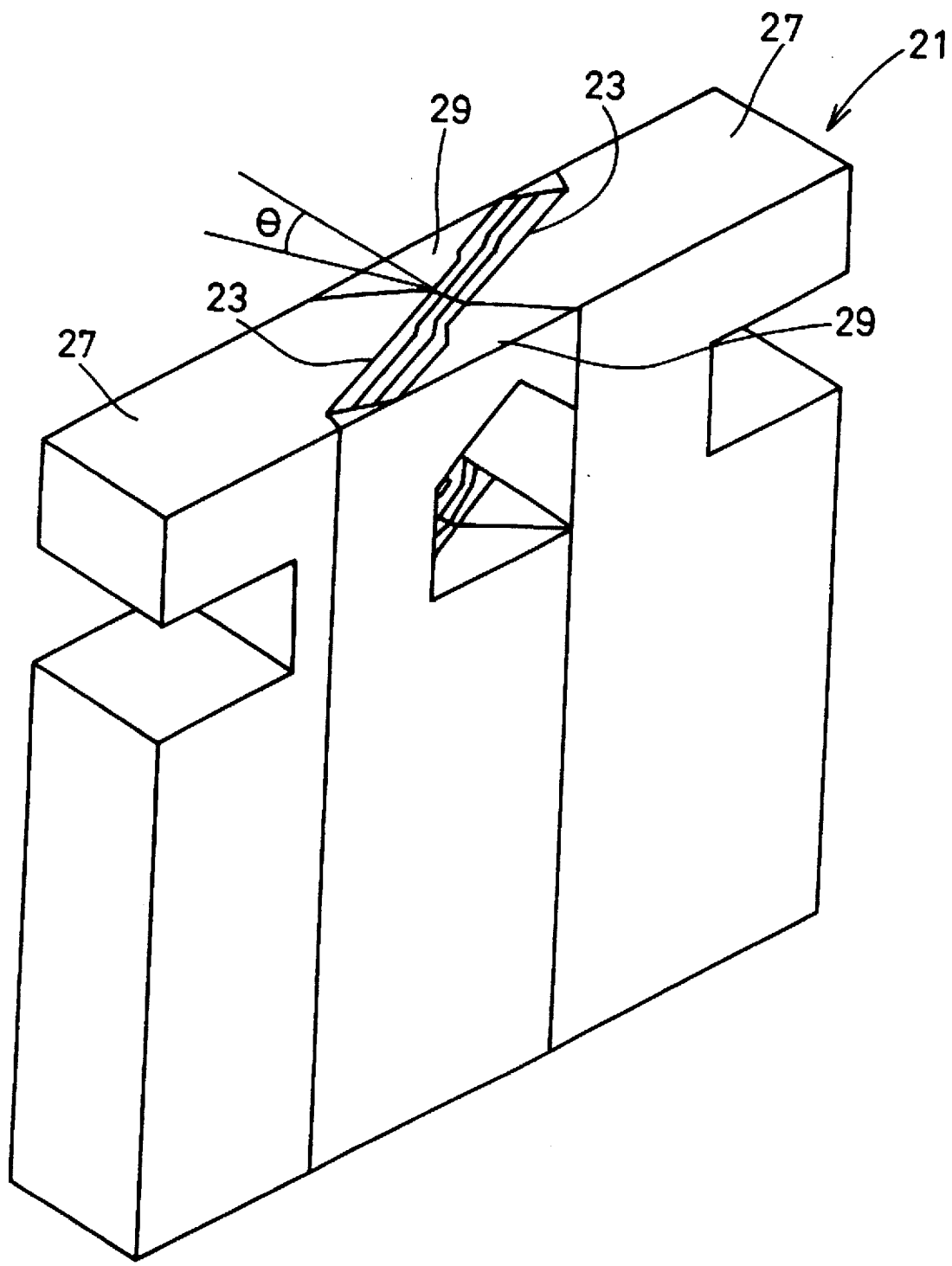
FIG. 10 is a perspective view of a second embodiment of the magnetic head according to the present invention.
Figure 11:
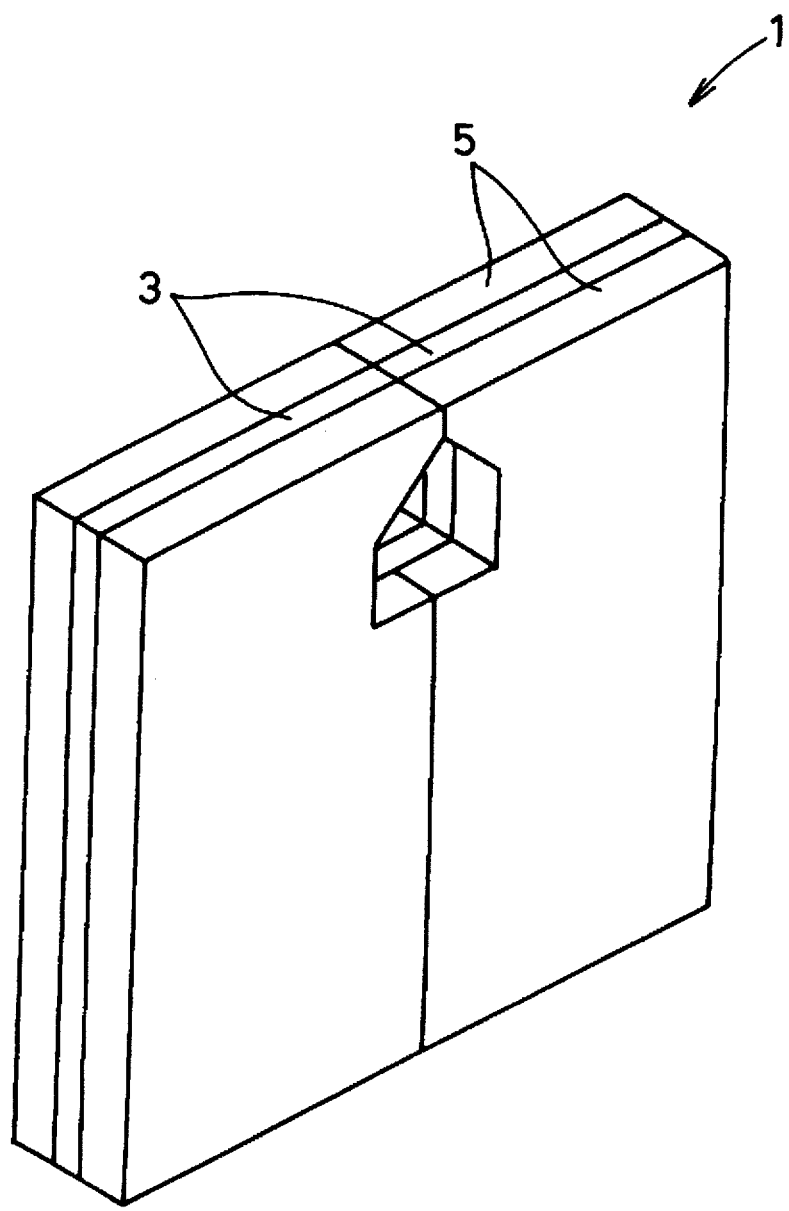
FIG. 11 is a perspective view of one example of a conventional magnetic head.
Figure 12:
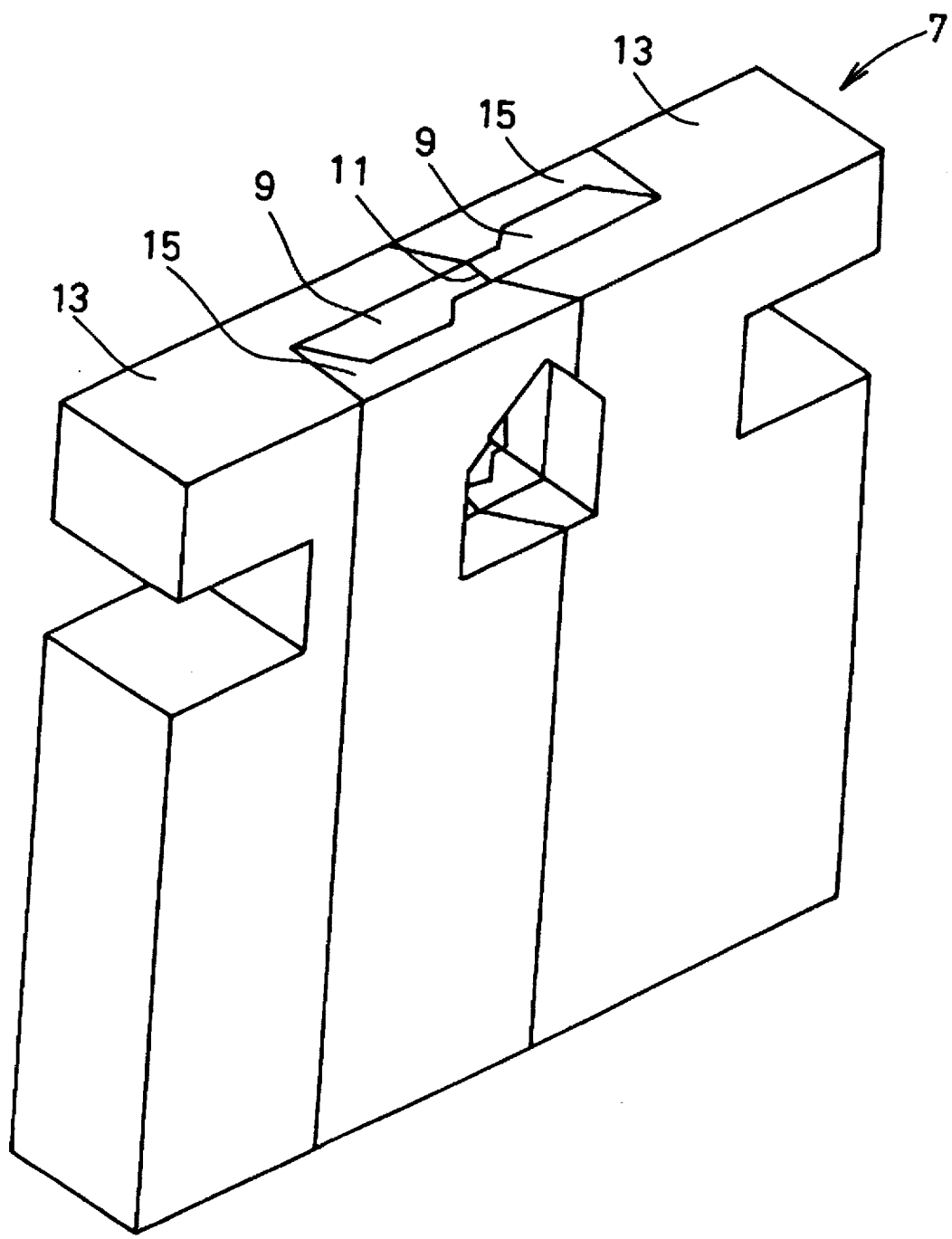
FIG. 12 is a perspective view of one example of the magnetic head disclosed in Japanese Patent Laying-Open No. 3-269809.
Figure 13:
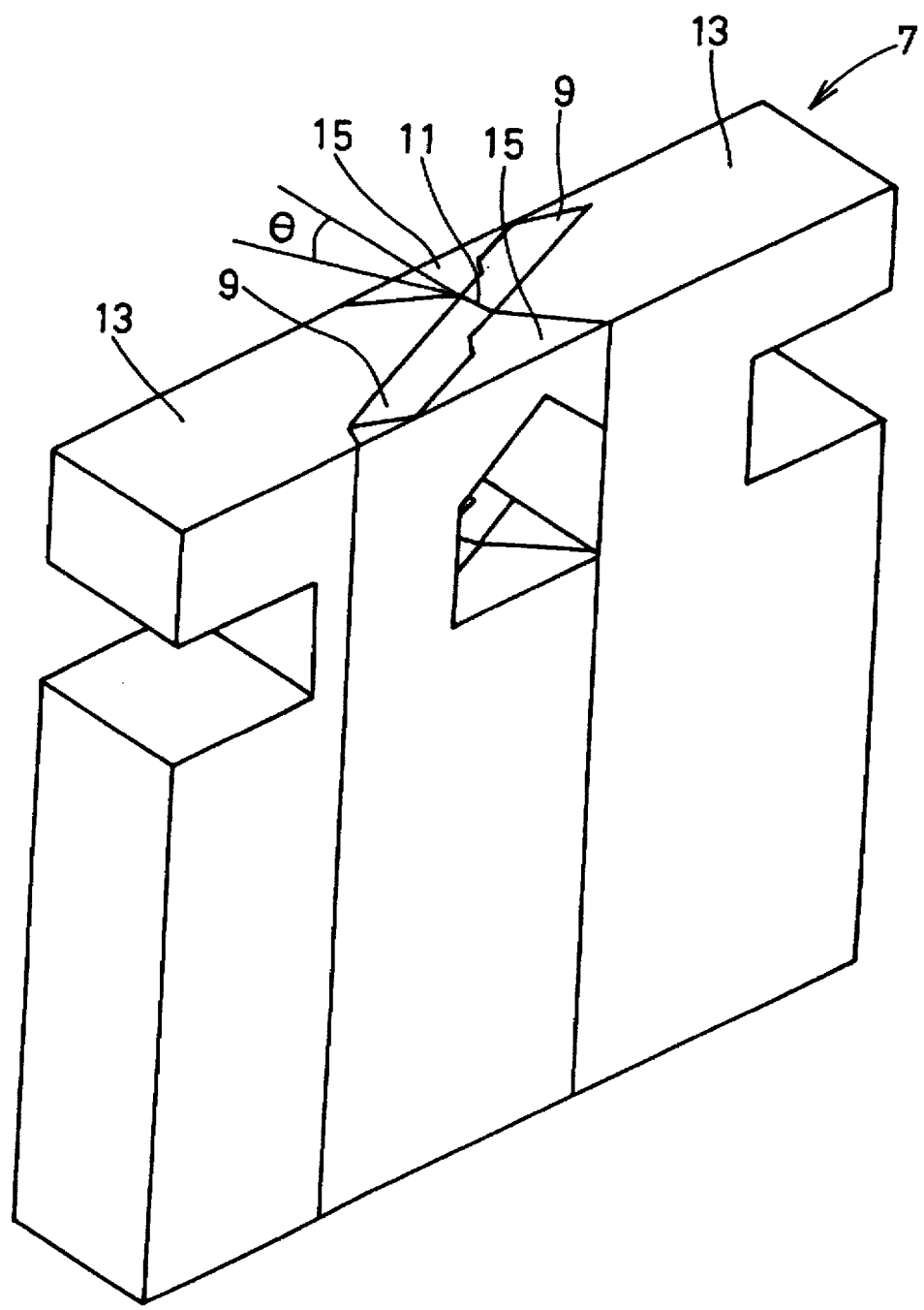
FIG. 13 is a perspective view of another example of the magnetic head disclosed in the above-described Japanese Patent Laying-Open No. 3-269809.
Figure 14:
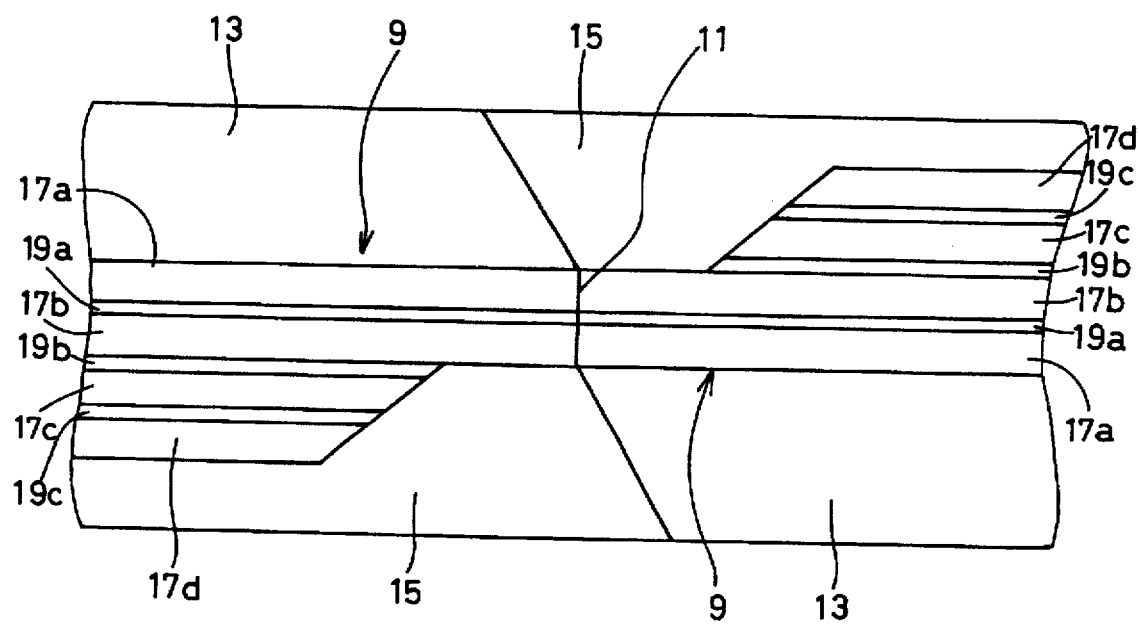
FIG. 14 is a partial plan view of a magnetic gap portion of the magnetic head shown in FIG. 13.

Description will now be given on the second embodiment of a magnetic head according to the present invention. FIG. 10 is a perspective view of the second embodiment of the magnetic head according to the present invention. In this embodiment, by inclining a direction in which magnetic core 23 extends with respect to an elongate direction of magnetic head 21, the azimuth angle θ of magnetic head 21 is changed. In this figure, the same reference characters are given to the same components as those in FIG. 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic head having a magnetic core in which the thickness of said magnetic core at transducing magnetic gap is made smaller than that of other portions of said core, wherein said magnetic core has a structure in which a plurality of soft magnetic thin films and a plurality of electrically non-conductive insulating thin films form alternating layers in a stack, and each of said soft magnetic thin films has a first thickness at said transducing magnetic gap, and a second thickness in a region distant from said transducing magnetic gap, said first thickness and said second thickness being in a direction perpendicular to a surface upon which said soft magnetic thin films and said insulating thin films are alternately formed in said stack, the second thickness being larger than the first thickness, and each of alternately stacked said soft magnetic thin films and said insulating thin films being directly in contact with said transducing magnetic gap.

2. The magnetic head as recited in claim 1, wherein a material of said soft magnetic thin films includes any of an FeAlSi system alloy, an NiFe system alloy, an FeSiCo system alloy, an FeSiGa system alloy, or a CoNbZr system alloy.

3. The magnetic head as recited in claim 1, wherein a material of said insulating thin films includes a non-magnetic oxide or a soft magnetic insulating material.

4. The magnetic head as recited in claim 1, wherein a material of said insulating thin films includes any of $SiO_2$, $Al_2O_3$ or a ferrite thin film.

5. The magnetic head as recited in claim 1, wherein said magnetic core is interposed between a non-magnetic substrate and a low melting point glass.

6. The magnetic head of claim 1 wherein each of the soft magnetic thin films has an end surface opposing the transducing magnetic gap and extends in the direction perpendicular to the end surface.

* * * * *